United States Patent [19]

Hughes-Hartogs

[11] Patent Number: 5,495,485
[45] Date of Patent: Feb. 27, 1996

[54] TRANSMISSION OF ANALOG AND DIGITAL INFORMATION ACROSS A SINGLE LINE

[75] Inventor: Dirk Hughes-Hartogs, Morgan Hill, Calif.

[73] Assignee: Canon Inc., Tokyo, Japan

[21] Appl. No.: 388,728

[22] Filed: Feb. 15, 1995

Related U.S. Application Data

[63] Continuation of Ser. No. 114,470, Aug. 31, 1993, abandoned.

[51] Int. Cl.$^6$ .............................. H04J 3/12; H04M 11/06
[52] U.S. Cl. ........................ 370/110.1; 379/100; 358/442
[58] Field of Search ........................... 370/60, 94.1, 94.2, 370/110.1, 60.1, 62, 58.1–58.3; 358/400, 401, 405, 406, 434–436, 438, 439, 476, 425, 404, 444, 440, 471, 407, 442; 379/93, 95, 100, 199, 188, 210, 211, 212, 214

[56] References Cited

U.S. PATENT DOCUMENTS

| | | | |
|---|---|---|---|
| 5,042,028 | 8/1991 | Ogawa | 370/110.1 |
| 5,050,005 | 9/1991 | Kagami | 358/434 |
| 5,189,695 | 2/1993 | Maei | 370/110.1 |
| 5,276,687 | 1/1994 | Miyamoto | 370/110.1 |
| 5,278,665 | 1/1994 | Sawada et al. | 370/110.1 |

OTHER PUBLICATIONS

Motorola University Press, "The Basics Book of OSI and Network Management", Addison–Wesley Pub., 1992, Ch. 3, pp. 24–25.
France Telecom, Inc. ISDN: A User's Guide, 1992.
Bellcore, Special Report, SR–NWT–002006, Issue 1, Aug. 1991.

Primary Examiner—Douglas W. Olms
Assistant Examiner—Ajit Patel
Attorney, Agent, or Firm—Elizabeth F. Enayati; Edward J. Radlo

[57] ABSTRACT

Apparatus for sending and receiving both analog and digital information from a single information transmission medium. The apparatus includes a core processor (200), including a digital signal processor (DSP) (212) or a CPU/DSP, in communication with an integrated services digital network (ISDN) interface (204). The core processor (200) also may be in communication with a personal computer (PC) (202). The invention also is directed to a related method, including a series of modules.

7 Claims, 4 Drawing Sheets

TRANSMISSION OF ANALOG AND DIGITAL INFORMATION ACROSS A SINGLE LINE

RELATED APPLICATIONS

This is a continuation of application Ser. No. 08/114,470 filed on Aug. 31, 1993, abandoned.

FIELD OF THE INVENTION

The present invention relates to systems for transmitting information, including both analog and digital signals, across telephone lines. Specifically, the present invention relates to the use of an integrated services digital network (ISDN) interface in an integrated system capable of handling transmission of both types of information.

BACKGROUND OF THE INVENTION

The original telephone system was developed to transfer sound over distance. Over the years, the capabilities on telephone lines have increased to the point where many functions can now be performed over the existing telephone lines. More features were added to the functionality of the telephone by the private address branch exchange (PABX).

The expanded functions of the telephone lines were enabled by the adoption of dual tone multifrequency (DTMF) signaling. Using DTMF signaling, digital information, such as dialing, could be passed from the telephone to the PABX as a type of audio signal. Telephone systems are limited in bandwidth to a range of between 200 Hz and 3,400 Hz. Because the time to transmit one bit of information is inversely proportional to the frequency, the rate of data transmission is affected by this bandwidth limitation. To increase the rate of data transmission, encoding has been used to allow more than one bit to be represented by one single pulse shape or signal level. This resulted a digital network for the telephone network.

The demands on use of such technology have expanded to the development of the integrated services digital network (ISDN) technology, an all-digital network. Basically, in an ISDN network all information, such as voice, data, and documents, still and moving images, is digitized and transmitted at high speed over a single, public switched network. All terminals linked to the network (e.g., telephones, computers, facsimile devices, video conference units, printers, or multimedia workstations combining several of these elements) use common connections. They use a single multipurpose jack, common building wiring, and shared network facilities. The most common transmission method is to translate the binary digits into pulses, when are then transmitted across the telephone network. The information that is transmitted is digital in nature, and less susceptible to noise signals than corresponding analog signals.

A model for rationalizing the definition of complicated communications systems has been developed by the International Standards Organization. A method of fracturing a communications system into its constituent parts, known as the open systems interconnect (OSI) model, is the standard environment in which the ISDN operates.

Briefly, the OSI model splits the operation of a communications system into seven layers, each layer defining a different function within the communications system. The seven layers, arranged in order of increasing visibility to the user, are: physical layer, defining the physical interface responsible for sending and receiving the information across the network; data link layer, responsible for performing error detection and correction of data and for sending and receiving error-free data across the network; transport layer, responsible for controlling the flow of information over the connection; session layer, responsible for controlling the entire operation of connecting to the network; presentation layer, which defines how the information is presented both to the network for transmission and to the end-user; and, application layer, which defines the interaction between the user and the communications system.

Present available equipment utilizing the analog fax (GIII) and digital fax (GIV) technology require the use of multiple telephone lines: one dedicated to analog information and one dedicated to digital information. Often additional lines will be added to handle other signals, for example for transmission of electronic information used in electronic mail systems. The system rapidly becomes cumbersome and involves multiple systems, each designed to handle a single signal type, physically interconnected.

Facsimile machines traditionally have been designed to operate according to Group I, Group II, Group III, or some combination thereof through a modem apparatus into an analog telephone line that provides a link to similar equipment at a distant location. With the advent of Group IV facsimile, the compressed image is not presented to a modem but is in general passed directly through a digital telephone link, such as those now becoming commonplace under ISDN.

Since Group III is an established standard, recently introduced Group IV machines, such as the Canon L-3300 and the Ricoh 4500I, provide separate but comparable processing boards for Group IV and Group III. Specifically, Group IV is provided through a distinct processing board linked to a digital connection, such as an ISDN telephone connection, and Group III is provided through a distinct processing board linked to an analog connection, such as a POTS telephone connection. These connections typically have two separate telephone numbers and to the outside user may appear as two separate facsimile machines, as indeed they are. These two machines are placed in a single box and share a scanner, printer, and power supply, but otherwise function as distinct devices.

Thus, there remains a need for a system that utilizes ISDN capabilities to enable the transmission of a plurality of analog and digital signals across a single telephone line without the use of multiple independent systems.

SUMMARY OF THE INVENTION

The present invention is an apparatus for receiving both analog and digital information from a single information transmission medium (222), such as a telephone line. The apparatus includes an integrated services digital network (ISDN) interface (204) coupled to the transmission medium (222). The ISDN includes at least a first and a second session layer and a digital signal processor (DSP) (212), including means for distinguishing between a first data type received at the first session layer and a second data type received at the second session layer in real time. The apparatus may further include an interface (220) with a personal computer (PC) (202).

The present invention also relates to an associated method, including a plurality of modules. The modules include a first I/O module (302) in communication with a channel set-up module (304) and a packet set-up module (306). These two modules (302, 304) are in communication with a driver modules (308), which in turn is in communication with a second I/O device (310).

The invention is further described in the following detailed description, figures, and claims.

DETAILED DESCRIPTION OF THE PREFERRED EMBODIMENTS

The present invention utilizes integrated services digital network (ISDN) technology in conjunction with several technologies, including digital and analog transmission of voice and image data, and transmission of electronic data. Although present systems enable separate transmission of each of these signal types along more than a single telephone line, there presently is no system that enables transmission of both analog and digital information, including electronic information, across a single transmission line, such as a telephone line.

A preferred embodiment of the present invention is built about the seven-layer open systems interconnect (OSI) model, which is the agreed International Standards by which systems should communicate. The seven layers, as depicted in FIG. 1, formalizes the natural layering of the telecommunications process for the interworking of computers, terminals, and applications.

Figure 1:
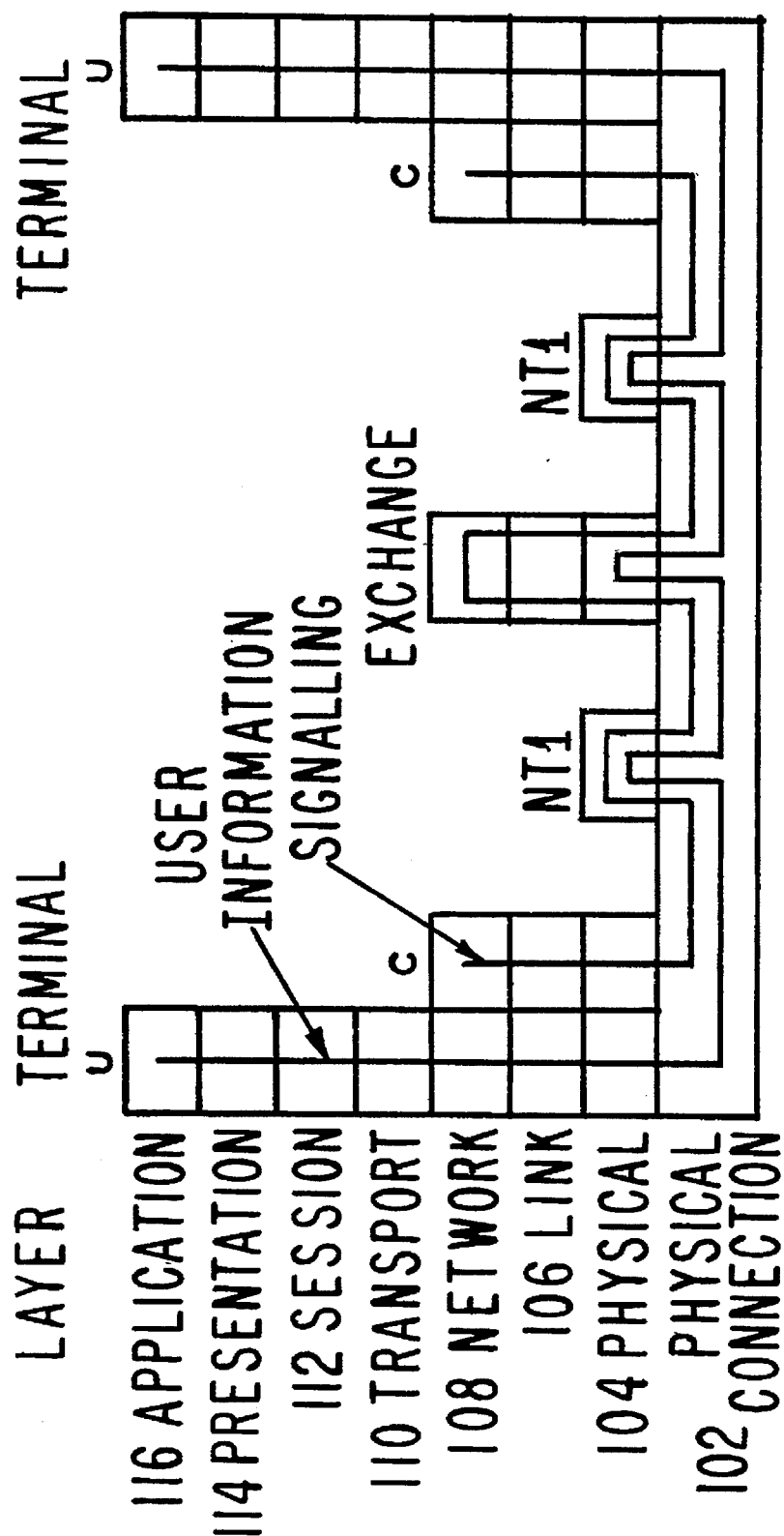
FIG. 1 depicts a typical seven-layer ISDN interface, including multiple session layers, that may be used in conjunction with an embodiment of the present invention.

As illustrated in FIG. 1, the OSI model begins with a physical connection (102) upon which the remaining layers are built. Layer 1 (104), the physical interface layer, defines the characteristics of the signal to be transferred over the bearer. It includes pulse amplitudes, line coding, transmission rates, connectors, and anything else that needs to transfer digits satisfactorily. This layer includes the ways in which data communications equipment is connected mechanically and electrically, and the means by which the data move across the physical connections from layer 1 at the source to layer 1 at the destination.

Layer 2 (106) is the link layer that provides discipline for the assembling of the digits. It provides error detection and correction by assembling the digits into frames. This layer (106) includes flow control of data as they pass down through this layer in one open system and up through the peer layer in the other open system.

Layer 3 (108) is the network layer that ensures that messages are routed to the appropriate destinations. This layer (108) also provides mechanisms to ensure the appropriate control and acknowledgment of messages. This layer (108) also provides routing and relaying of data through the network.

Layer 4 (110) is the transport, or terminal-to-terminal, layer. Data may be carried across the networks using various forms of Layers 1 (104), 2 (106), and 3 (108), via a LAN and ISDN, but the terminals must have information at appropriate rates. This layer (110) ensures that an end-to-end connection has been established between the two open systems. That is, layer 4 at the destination "confirms the request for a connection" that it has received from layer 4 at the source.

Layer 5 (112) is the session layer. This layer (112) defines the way in which applications running at the two ends of the link intercommunicate, including initiation and termination of sessions and coordinating their activity during the session. This layer (112) provides synchronization control of data between the open systems. It makes sure the bit configurations that pass through layer 5 at the source are the same as those that pass through layer 5 at the destination.

Layer 6 (114) is the presentation layer that establishes the common format which is to be used between terminals, using common rules for representing data. This layer (114) assures that the user information is in a format that the destination open system can understand.

The final layer, layer 7 (116), is the application layer that provides for a user application to interface with the OSI application layer. The application represents the task to be performed, for example, file transfer, airline booking, message handling, and the like. The OSI application layer has a corresponding peer layer in the other open system.

Actual data flow between two open systems typically is from top to bottom in one open system, across the communications line, and then from bottom to top in the other open system. Each time user application data pass downward from one layer to the next in the same system, processing information is added. When that information is removed and processed by the peer layer in the other system, it causes various tasks to be performed.

In the ISDN there are two types of channels. First, the 64 kbit "B" circuit-switched channel for customer use. For straightforward data purposes in simple terms the ISDN defines only the Layer 1 attributes of this channel, the customer being free to use the bits provided for its own higher layer protocols. The 16 kbit "D" signaling channel includes all three layers.

Figure 2:
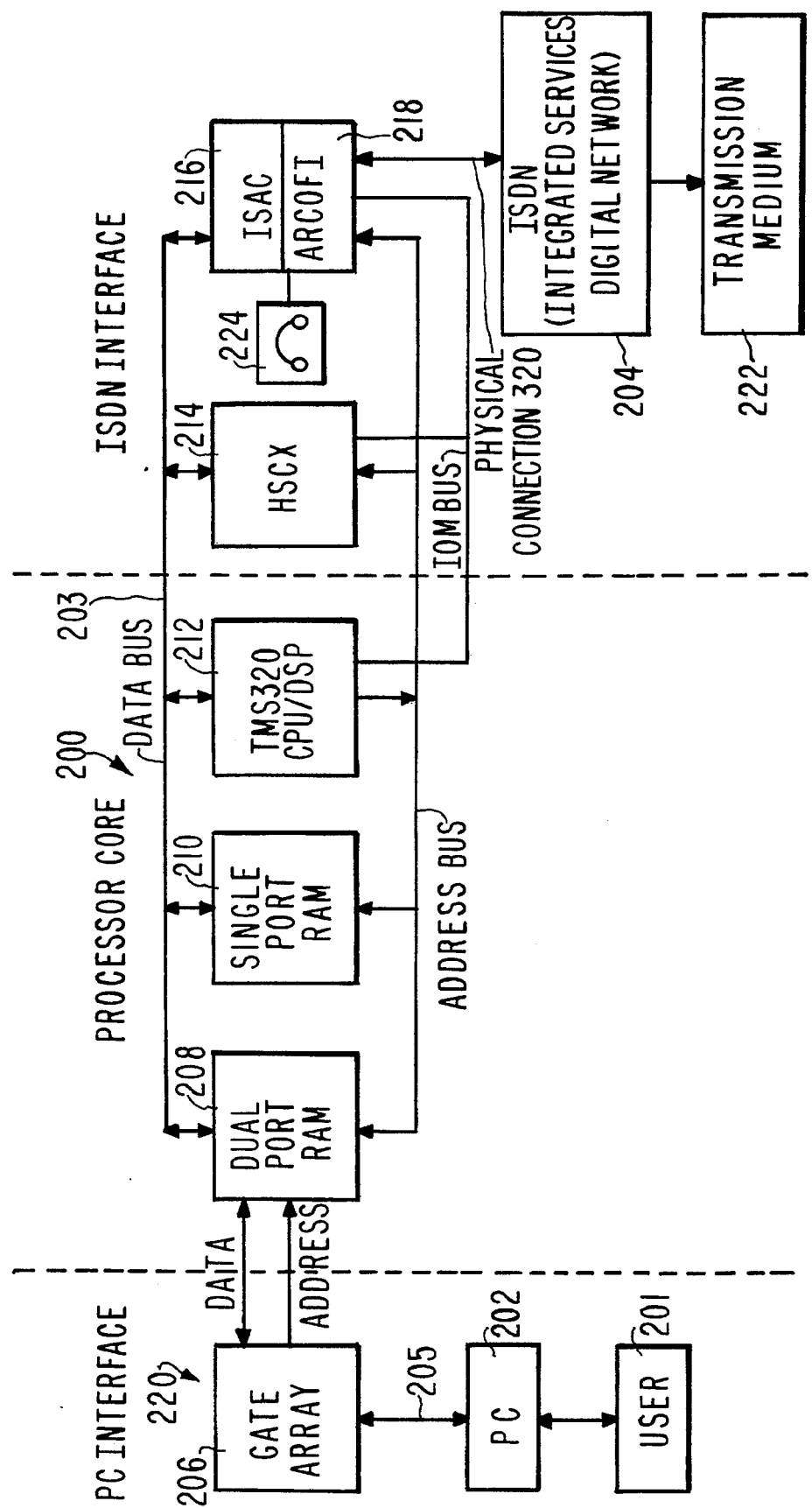
FIG. 2 is a block diagram of a preferred embodiment of the present invention.

Turning now to FIG. 2, that figure illustrates an exemplary hardware configuration embodying the present invention. The system includes a processing board (200) that interfaces both with a personal computer (PC) (202), and ultimately to the end-user (201) and to an ISDN telephone connection (204). The interface with the PC (202) preferably is through a PC interface (220) via a bus (205), which may be an industry standard architecture (ISA) bus. The PC interface (220) may include a gate array (206).

Data are transferred to or from the processor (200) via gate array (206) and dual port RAM (208). These data then are transferred to a single port RAM (210), which may operate as the main memory of the system. The single port RAM (210) contains both dynamic RAM (DRAM), its controller, and static RAM (SRAM), and provides both data and instructions to the PC (202).

In a preferred embodiment, the data are processed by a combined CPU/DSP device (212), such as a TMS320 commercially available from Texas Instruments Inc., having both ROM and boot capabilities. The result from the processor device (212), now ready to be output as a B channel data stream, is transferred back to the single port RAM (210) and subsequently sent on the ISDN connection (204) on the data bus (203) using an interface device (216), such as ISAC commercially available from Siemens Corp., under the control of a system controller (214). In a preferred embodiment, the system controller (214) is a high-level serial communication controller-extended (HSCX) device commercially available from Siemens Corp. An audio interface (218), such as an ARCOFI commercially available from Siemens Corp., also may be selected to provide a direct, i.e., unprocessed, voice connection to one of the B channels.

In the illustrated embodiment of FIG. 2, the apparatus includes a single string of processing components, rather than a multiplicity of parallel structures for each different form of communication. Thus, manufacturing costs are reduced by eliminating duplicity in parts, and control is centralized through the processor (200).

In one example, e-mail is received from the PC (202), it comes into the processor (200) and is processed by the CPU/DSP (212). The processed data goes out on the IOM bus to the HSCX (214), where the data are processed under the control of the ISAC (216). The processed data then are conveyed to the ISDN (204). In that example, it still may be possible to use the telephone connection by picking up a telephone handset (224) that is connected through the ISDN (204). The voice data are processed between the ARCOFI (218) and the ISAC (216).

Figure 3:
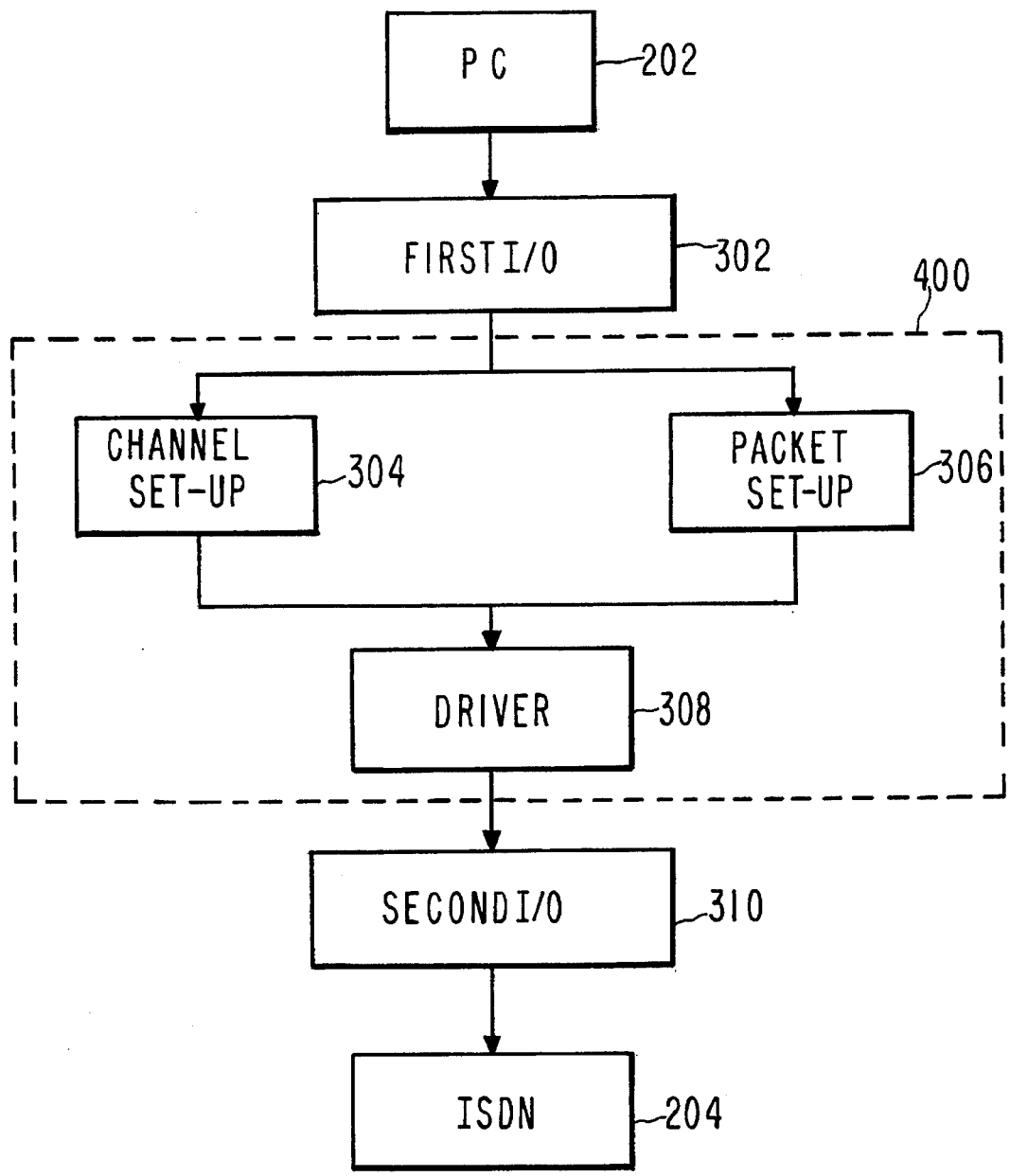
FIG. 3 is a general flow chart of a preferred embodiment of the present invention.
Figure 4:
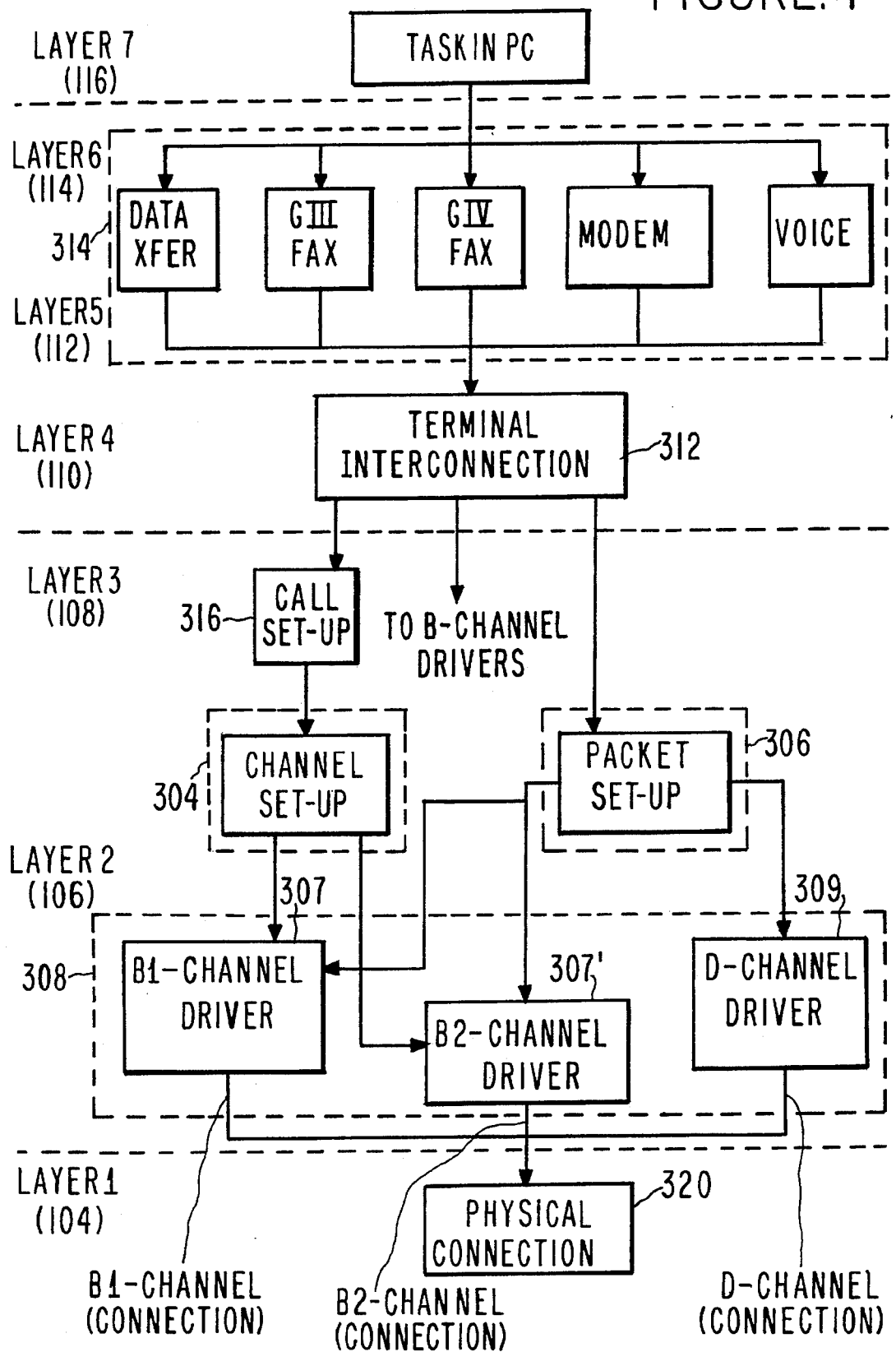
FIG. 4 is a flow chart of a preferred embodiment of the present invention.

Certain ones of the hardware components may be controlled by standard software programs either commercially available or readily programmable. In a preferred embodiment, the following modules are included in the present system. In other embodiments, additional modules may be included, and selected ones of the modules described below may be omitted. A flow chart depicting the modules shown in FIG. 3. The modules preferably reside in the DSP (212), or in other devices according to the specific system configuration. FIG. 4 is a flow chart showing the relationship between the modules shown in section (400) of FIG. 3 and the layers of the OSI model of FIG. 1. Section (400) may reside in a DSP (212).

A first I/O module (302) may be included to control the dual port memory (208) and to control the flow of data to and from the PC (202). The first I/O module (302) preferably is in communication with a channel set-up module (304) that includes DTMF and tone generation. The first I/O module (302) may also be in communication with a packet set-up module (306) that includes link access protocol (LAPB/LAPD) connections. A driver module (308) may be in communication with both the channel set-up module (304) and the packet set-up module (306) and includes a re-entrant B1 channel driver (307), B2 channel driver (307'), and a D channel driver (309). The second I/O module (310) is in communication with the driver module (308) and controls the HSCX (214), the ISAC (216), and the ARCOFI (218), as well as the flow of data to and from the ISDN connection (204).

The first I/O module (302) may allocate available resources on the processor (200), such as the CPU/DSP (212) or either one of the memory devices (208, 210). This operation may be performed either by metering processing of individual B channels or by logical connections. In this manner, the system may be capable of simultaneously handling two calls.

The driver module (308) of a preferred embodiment of the present invention toggles between using multiple channels, such as using two B channels to transmit packets of data from the same data stream, and using a single channel to send/receive a packet of data. Such decisions made by the system preferably depend on predetermined priority criteria and may depend on the specific requirements and demands on the system. All driver modules (308) output to a physical connection (320), which may be copper wire.

The system further may include a terminal interconnection module (312) which interconnects the functions of Layers 5 and 6 with those in Layers 2 and 3. A toggle module (314) may be included to toggle between the different modules that control data transfer for the various devices, such as G3, G4, and the like.

A multi-tasking operating system (OS) also may be included that allows the real time operations of the first I/O module, the real time and continuous operation of multiple copies of the second I/O module, and the multi-tasking of at least two signal processing functions, described in further detail below. This OS may support the continuous flow of the second I/O control module.

Single or multiple modules may be included for providing communications support functions. For example, such modules may support LAPB/LAPD connections (such as the packet set-up module 306), DTMF and other tone generation (such as the channel set-up modules 304), V.120, call set-up (316), and other functions of Layers 2 and 3 of the OSI model (described above). A first signal processing module may be included to direct movement of unprocessed data from the PC (202) to the ISDN (204) as a data connection. A second signal processing module also may be included for connection of the ARCOFI (218) to some voice connection.

Additional signal processing modules may be included to perform various functions, such as page-by-page processing of Group IV facsimile data, which involves a digital facsimile on a digital line. The data compression necessary to process an image typically is performed in the PC (202) and the compressed image is passed to the card (200). Additional signal processing may include page-by-page processing of Group III facsimile data, include a V.29 or V.17 modem function, which involves an analog facsimile on a digital line. The CODEC typically found in such devices no longer is necessary because the V.29 output voltage is passed directly to the ISDN in digital form. This format assumes a POTS or analog device on the other end of the connection. Other signal processing may include a V.22bis, V.32, or V.32bis modem function performed by the DSP (212) on a file or other digital data stream. The resulting voltage is passed to the ISDN (204). This format also assumes a POTS or analog device, e.g., a modem, on the other end of the connection.

In practicing the present invention, the apparatus may support either a unique telephone number for each form of communication, one telephone number for all forms of communication, or any intermediate configurations. Each such configuration, however, is limited to transmission across a single telephone line, or other transmission medium. Further, the apparatus preferably supports two B channels, each of which physical channels may be assigned independently to any digital or analog format. The apparatus may be expanded to support a multiplicity of channels, such as the 23 B format typical for North American T1 links without further definition of structure.

The system further may include a look-up table that enables one piece of equipment to mimic a variety of hardware in response to input or query signals received. Thus, the apparatus may include means for responding to calls directed to a set of telephone numbers or subaddresses appearing on the ISDN bus. The set of numbers preferably has a cardinality greater than the number of physical channels available from the processor (200).

While one particular embodiment of the invention has been described in detail, it will be understood that the invention may be implemented through alternative embodiments. Thus, the scope of the invention is not intended to be limited to the embodiments described above, but is to be defined by the appended claims.

What is claimed is:

1. Digital apparatus for sending and receiving analog and digital information to and from a single information transmission medium, said apparatus comprising:

A. an integrated services digital network ISDN interface coupled to the transmission medium, the ISDN interface including at least a first connection and a second independent connection; and B. coupled to the ISDN interface, a digital signal processor DSP not containing any codecs and comprising:

means for distinguishing, in real time, a first data type associated with the transmission medium at the first connection and a second data type concurrently associated with the transmission medium at the second connection; and means for coupling:

a) a direct digital representation of voltage associated with one of said data types and b) one of the connections.

2. The apparatus of claim 1, wherein the first connection represents analog data and the second connection represents digital data.

3. The apparatus of claim 2, wherein G3 facsimile data is received at the first connection and G4 facsimile data is received at the second connection.

4. The apparatus of claim 2, wherein the distinguishing means comprises means for distinguishing between G3 facsimile data received at the first connection and V.32bis communication data received at the first connection.

5. The apparatus of claim 1, wherein the first data type comprises G3 data, and wherein the second data type comprises G4 data.

6. The apparatus of claim 1, wherein the ISDN interface includes a plurality of B-channels, the coupling means comprising terminal interconnection means for selectively transmitting data having a predetermined format along one of the B-channels.

7. The apparatus of claim 1, further comprising a personal computer PC in communication with the ISDN interface.

* * * * *